(12) United States Patent
Callahan et al.

(10) Patent No.: US 7,185,850 B2
(45) Date of Patent: Mar. 6, 2007

(54) CUT TO FIT POWERED SEAT TRACK COVER

(75) Inventors: Kevin S Callahan, Shoreline, WA (US); Bradley J Mitchell, Snohomish, WA (US); Trevor M Laib, Woodinville, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 10/943,035

(22) Filed: Sep. 16, 2004

(65) Prior Publication Data

US 2006/0102784 A1 May 18, 2006

(51) Int. Cl.
*B64D 11/06* (2006.01)

(52) U.S. Cl. ................ 244/118.6; 244/129.1; 439/110; 439/210; 174/74 R

(58) Field of Classification Search ......... 244/118.5, 244/118.6, 122 R; 439/210; 174/10, 70 R, 174/74 R; 297/344.1
See application file for complete search history.

(56) References Cited

U.S. PATENT DOCUMENTS

| 2,320,332 | A | * | 5/1943 | Morten ................. 174/74 R |
| 3,110,754 | A | * | 11/1963 | Witort et al. ............ 174/70 R |
| 3,143,593 | A | * | 8/1964 | Toto ..................... 174/15.7 |
| 3,383,456 | A | * | 5/1968 | Arno .................... 174/68.1 |
| 4,428,078 | A | | 1/1984 | Kuo |
| 4,748,913 | A | * | 6/1988 | Favaretto et al. ........... 312/195 |
| 4,763,360 | A | | 8/1988 | Daniels et al. |
| 4,853,555 | A | | 8/1989 | Wheat |
| 4,875,871 | A | * | 10/1989 | Booty et al. ............ 439/209 |
| 6,341,875 | B1 | * | 1/2002 | Chu .................... 439/210 |
| 6,601,798 | B2 | * | 8/2003 | Cawley ................. 244/118.6 |
| 6,619,588 | B2 | * | 9/2003 | Lambiaso .............. 244/118.5 |
| 2004/0017648 | A1 | * | 1/2004 | Tsubaki ............... 361/601 |
| 2004/0159764 | A1 | * | 8/2004 | Oshima et al. ......... 297/344.1 |
| 2005/0215095 | A1 | * | 9/2005 | Mitchell et al. .......... 439/110 |

* cited by examiner

*Primary Examiner*—Galen Barefoot

(57) ABSTRACT

A seat track cover for transferring at least one of electrical power and data between two seats. The cover has a housing and a cable. The housing is sized to extend between a first seat leg assembly of a first seat and a second seat leg assembly of a second seat. The housing comprises a channel forming a first aperture at one end and a second aperture at a second end opposite the first aperture. The cable is seated within the housing and has a length at least equal to the length of the housing. The cable comprises a first connector and a second connector. The cable is seated within the housing such that the first connector is at the first aperture of the housing and the second connector is at the second aperture of the housing. The first connector couples with the first seat leg assembly and the second connector couples with the second seat leg assembly when the housing is positioned between the first seat leg and the second seat leg. In this manner, the cover provides a simple and economical connection between two seats using a cable having a standard length.

22 Claims, 9 Drawing Sheets

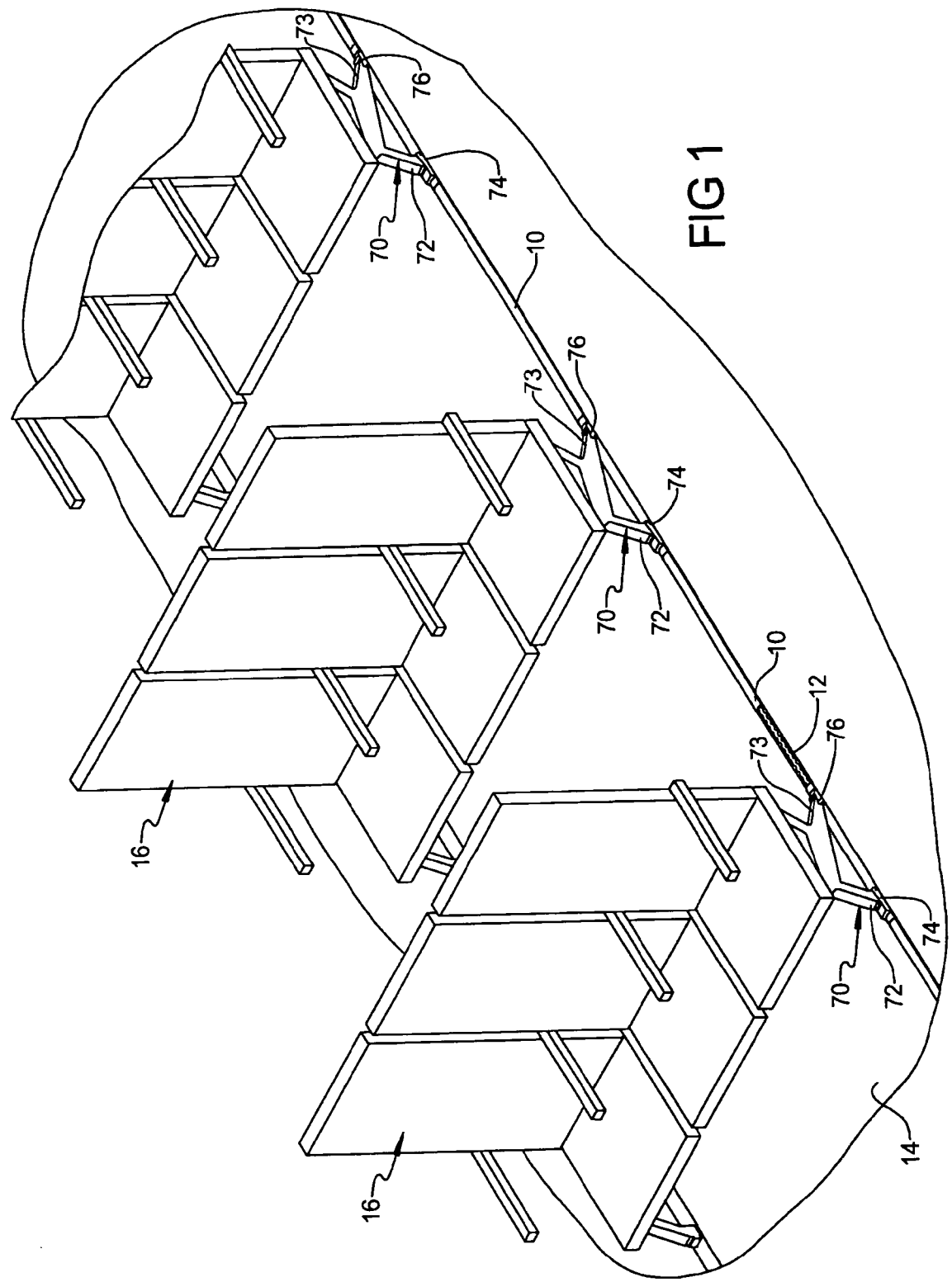

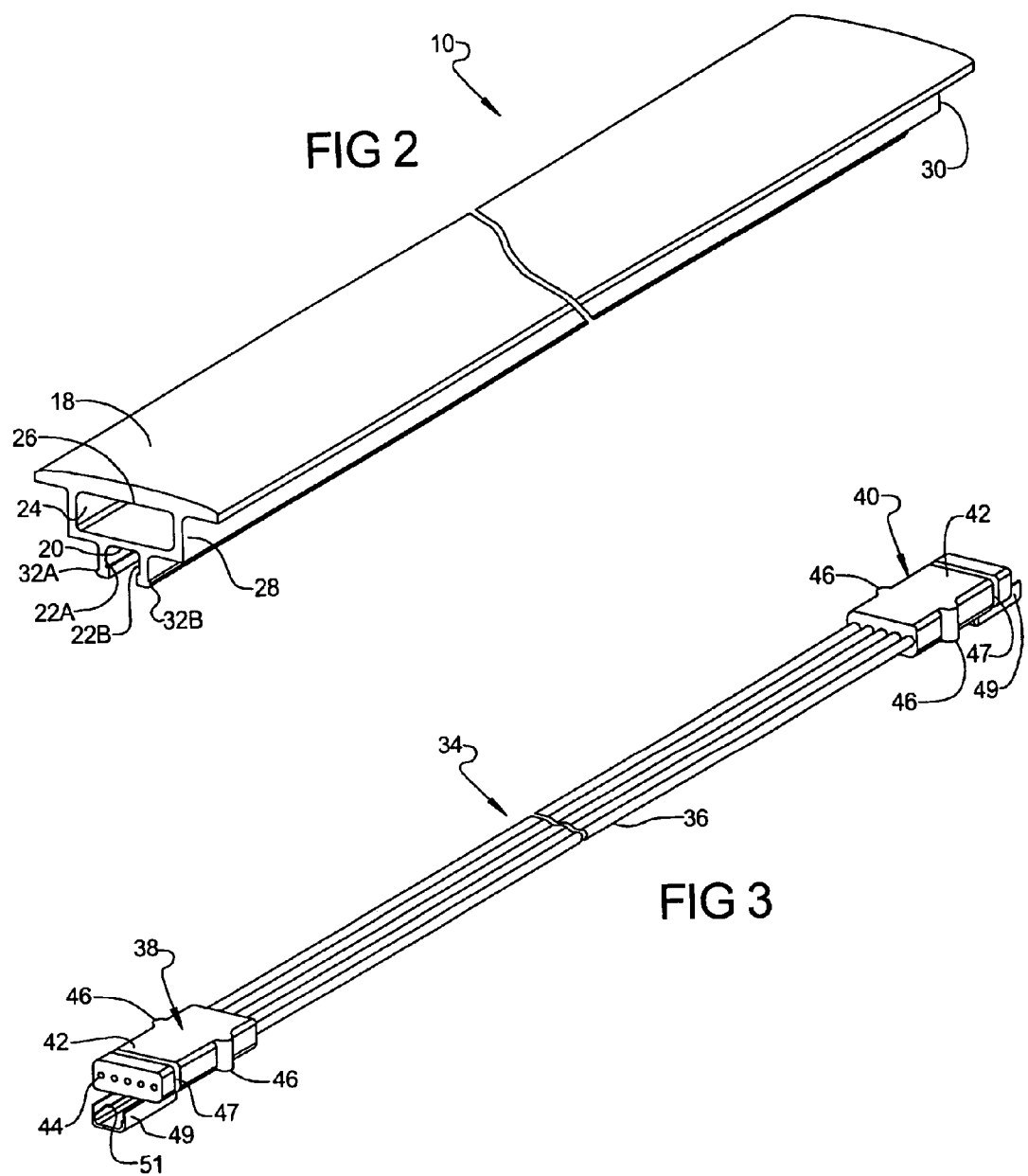

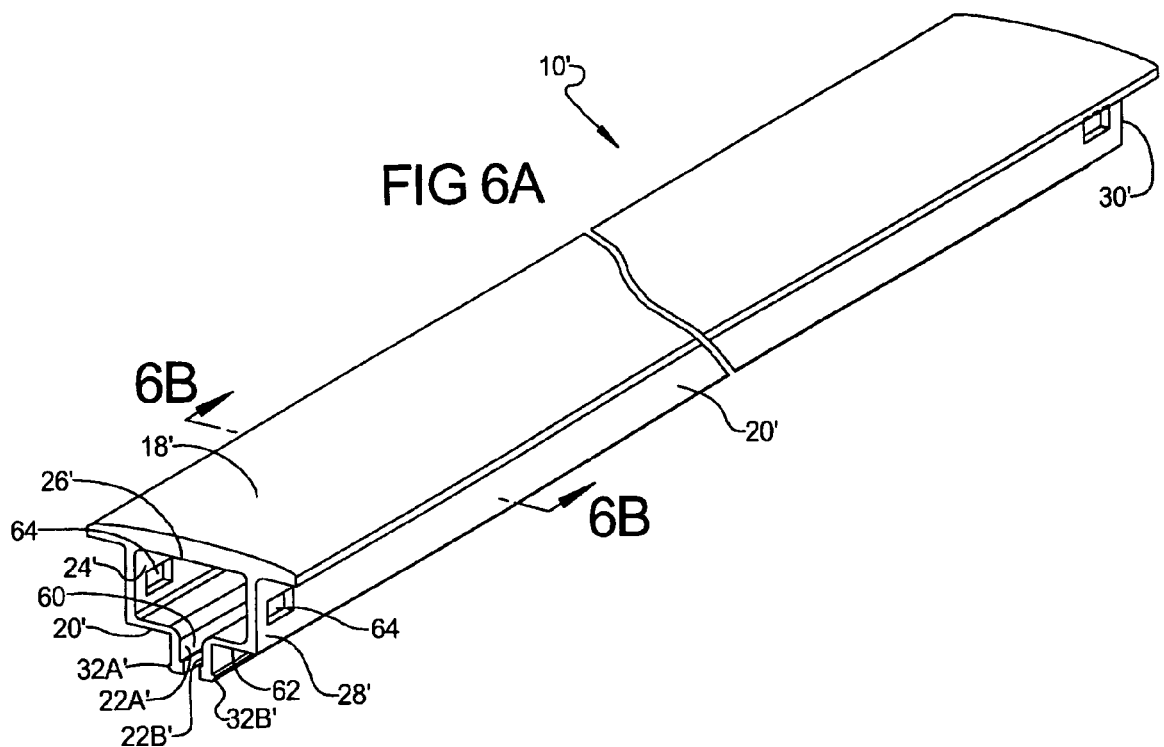
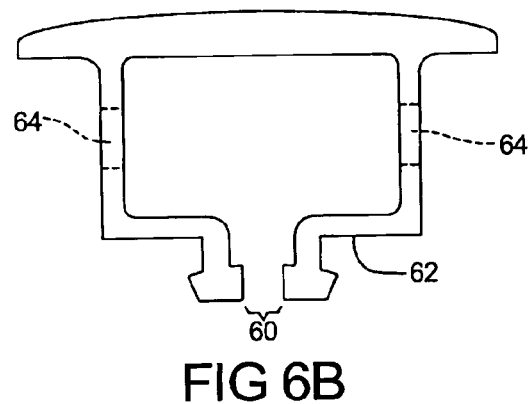

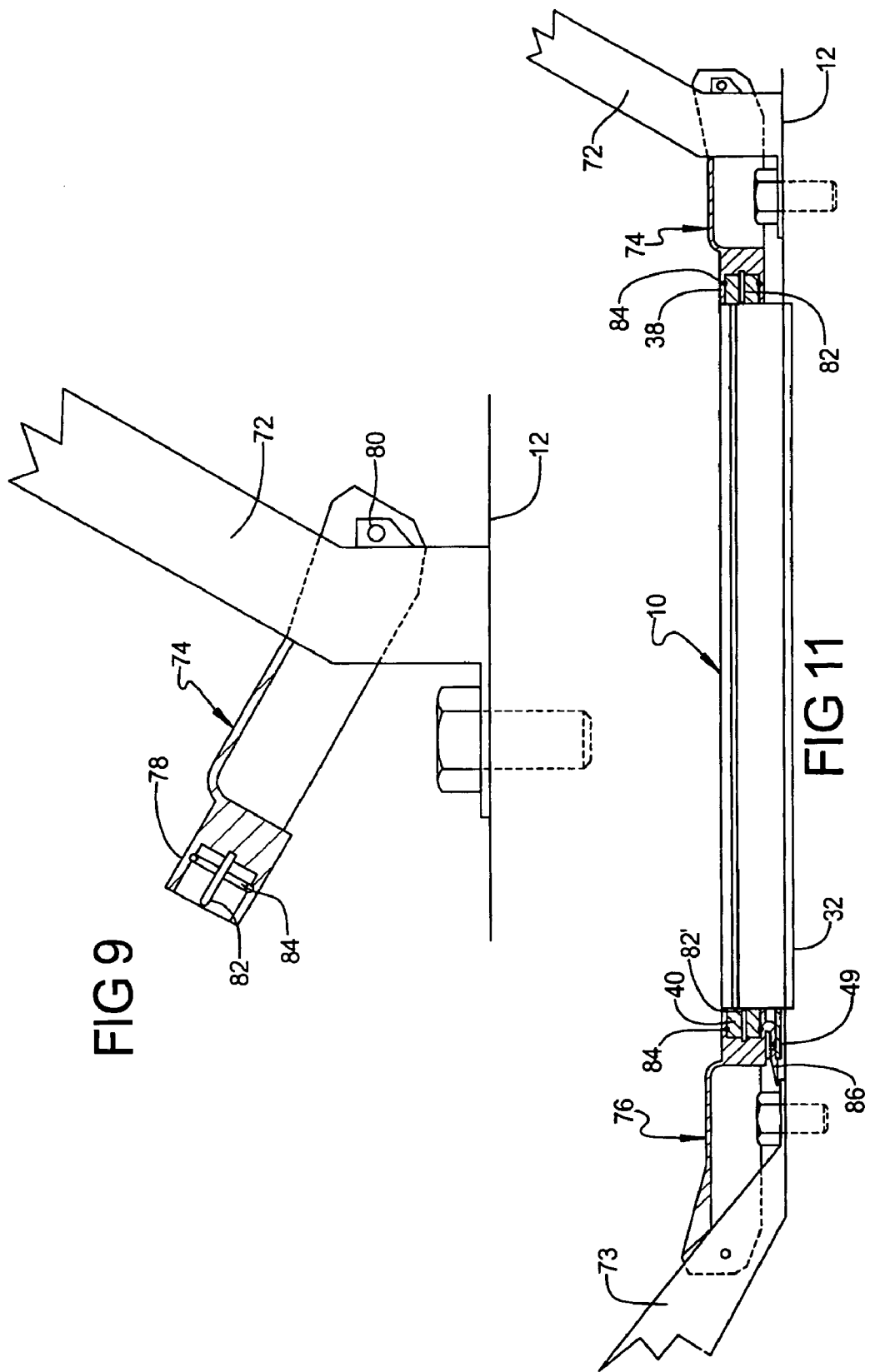

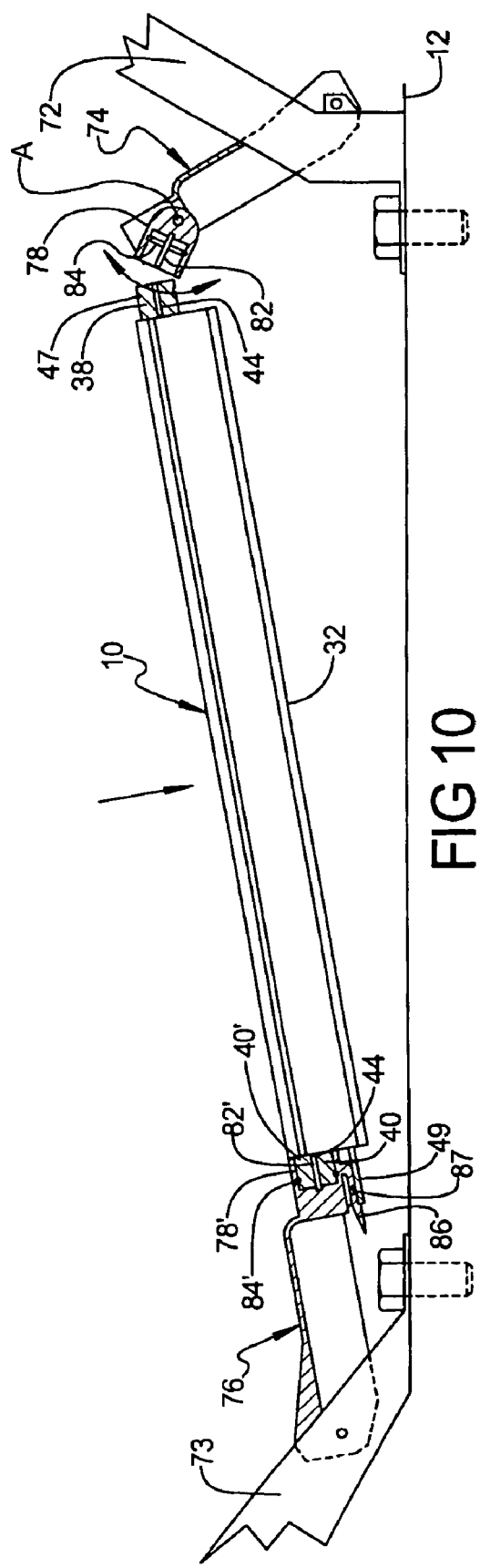

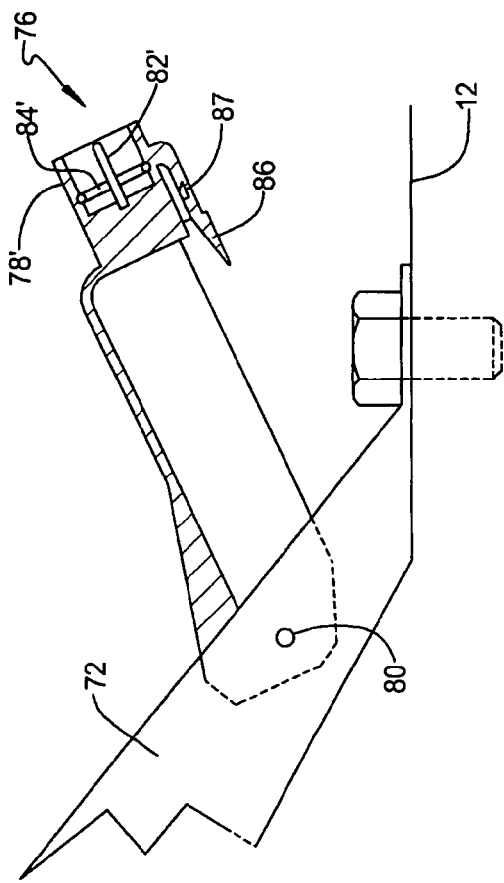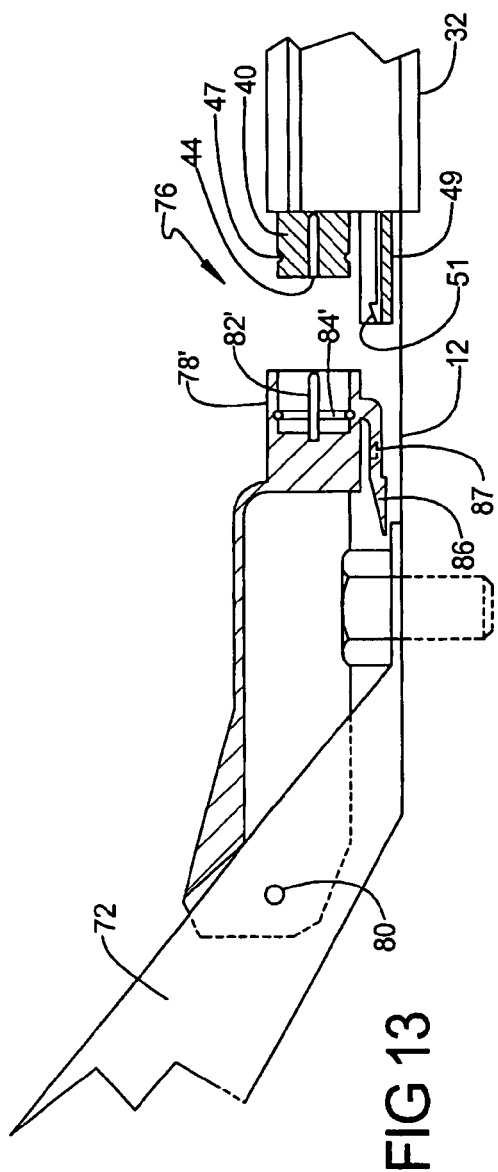

US 7,185,850 B2

CUT TO FIT POWERED SEAT TRACK COVER

FIELD OF THE INVENTION

The present invention relates to mobile platform passenger seats. In particular, the present invention relates to a seat track cover that houses a cable for providing an electrical or optical connection between one or more passenger seats.

BACKGROUND OF THE INVENTION

Commercial aircraft operators and passengers are increasingly requesting in-flight entertainment (IFE) and electrical power outlets to enable passengers and/or crew members to operate various personal electronic devices, such as laptop computers, at their seats. To provide passengers and/or crew members with such features, electrical power and data communications capability must be delivered to each seat. Power and data are delivered to aircraft passenger seats via one or more cables that extend from a power or data source to the passenger seats. The cables typically extend up through a floor access panel and along one or more seat tracks recessed within the floor of the aircraft passenger cabin. The seat track is covered by a seat track cover.

SUMMARY OF THE INVENTION

It is desirable to eliminate the need to run individual power and/or data cables to each aircraft passenger seat or seat group. The present invention provides for a seat track cover that includes one or more cables to transfer electrical power and/or data between two seats and eliminates the need to run individual cables in addition to the seat track cover to each seat or seat group. During assembly, the cover is cut to match the approximate length between the seats. At least one cable having a standard length equal to or greater than the length of the cover is inserted within the cover.

In one preferred form, the present invention provides for a seat track cover for transferring at least one of power and data between two seats comprising a housing and a cable. The housing is sized to extend between a first seat leg assembly of a first seat and a second seat leg assembly of a second seat. The housing comprises a first aperture and a second aperture opposite the first aperture. The cable is seated within the housing and has a length at least equal to the length of the housing. The cable comprises a first connector and a second connector. The cable is seated within the housing such that the first connector is at the first aperture of the housing and the second connector is at the second aperture of the housing. The first connector cooperates with the first seat leg assembly and the second connector cooperates with the second seat leg assembly when the housing is positioned between the first seat leg and the second seat leg.

The invention further provides for a device for transferring power and data between a first seat and a second seat comprising a seat track cover and a cable. The seat track cover is sized to extend between the first seat and the second seat. The cable is supported by the seat track cover. The cable has a length at least equal to a length of the seat track cover. The cable provides a connection between the first seat and the second seat.

The invention still further provides for a method for providing an electrical or optical connection between a first seat and a second seat. The method includes the steps of sizing a housing to a length that approximates a distance between the first seat and the second seat, selecting a cable from a plurality of cables each having a standard length that is independent of the distance between the first seat and the second seat, which is greater than the length of the housing, mounting the cable to the housing, and positioning the housing between the first seat leg and the second seat leg such that the cable makes an electrical or optical connection with both the first seat and the second seat.

The features, functions, and advantages can be achieved independently in various embodiments of the present inventions or may be combined in yet other embodiments.

BRIEF DESCRIPTION OF THE DRAWINGS

The present invention will become more fully understood from the detailed description and the accompanying drawings, wherein:

FIG. 1 is a perspective view of aircraft passenger seat groups each connected by a seat track cover according to the present invention;

FIG. 2 is a side perspective view of the seat track cover of FIG. 1;

FIG. 3 is a side perspective view of a cable used with the seat track cover of FIG. 1;

FIG. 6A is a perspective view of a seat track cover according to an additional embodiment of the present invention;

FIG. 6B is a cross-sectional view taken along line 6B—6B of FIG. 6A;

FIG. 9 is a side cross-sectional view of a front connector assembly of one of the seat groups of FIG. 1;

FIG. 10 is a pre-installation side view, in partial cross-section, of the seat track cover of FIG. 2 between the front connector assembly of FIG. 9 according to an additional embodiment and a rear connector assembly;

FIG. 11 is a side view, in partial cross-section, of the seat track cover of FIG. 2 installed between the front connector assembly of FIG. 9 and a rear connector assembly;

FIG. 12 is a side view of a rear connector assembly of one of the seat groups of FIG. 2;

FIG. 13 is a side cross-sectional view of the seat track cover of FIG. 2 being secured to the rear connector assembly.

DETAILED DESCRIPTION OF THE PREFERRED EMBODIMENTS

Figure 4:
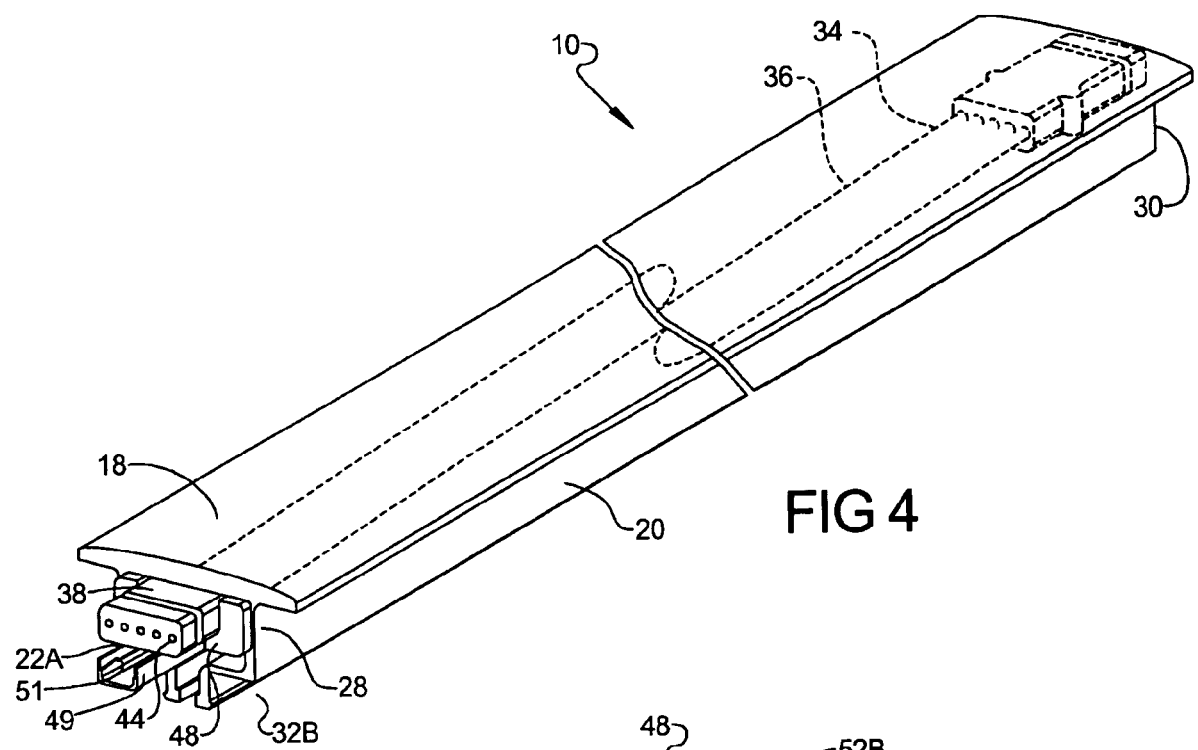
FIG. 4 is an assembled view of the seat track cover of FIG. 1 including the cable of FIG. 3.

The following description of the preferred embodiments is merely exemplary in nature and is in no way intended to limit the invention, its application, or uses.

With initial reference to FIG. 1, a number of seat track covers according to a preferred embodiment of the present invention are illustrated at 10. The seat track covers 10 are illustrated as extending along a seat track 12. The seat track 12 is recessed within an aircraft passenger cabin floor 14 between aircraft passenger seat groups 16. However, it will be appreciated that the present invention is not limited to use in an aircraft passenger cabin, but can be implemented in any form of mobile platform, such as a ship, train, bus, motor-craft, etc. as well as on any stationary platform, such as in theatre seats and stadium seats.

With additional reference to FIG. 2, the seat track cover 10 is generally an elongated strip having a length that is greater than its width. The seat track cover 10 generally includes a top portion 18, a housing 20, and first and second flanges 22A and 22B. The top portion 18 is located above the housing 20 and the flanges 22 extend from a bottom of the housing 20. The top portion 18 is wider than the width of the housing 20 and preferably has an arcuate surface contour.

The housing 20 extends the length of the top portion 18. The housing 20 defines a channel or through hole 24 that extends the entire length of the cover 10. The through hole 24 terminates to form a first opening 26 at a first end 28 of the housing 20 and a second opening (not shown) at a second end 30 of the housing 20, the first opening 26 being substantially similar to the second opening. The channel 24 can also take the form of a tube.

The flanges 22A and 22B extend downward from the housing 20. The flanges 22 terminate in a first tab 32A and a second tab 32B respectively. Each of the tabs 32A and 32B are slightly wider than the flanges 22. At least a portion of the flanges 22 are flexible to permit movement of the flanges 22 during installation.

With additional reference to FIG. 3, an electrical and/or optical cable according to a preferred embodiment of the present invention is illustrated at 34. The cable 34 is illustrated as a ribbon cable having a flexible wire portion 36. The wire portion 36 terminates in a first connector 38 at a first end and a second connector 40 at a second end. While the cable 34 is illustrated and described as a flat wire cable, the cable 34 can be any type of suitable conductor for conducting power and/or data. For example, the cable 34 can be a flat wire cable, a fiber optic cable, or one or more coaxial cables.

As illustrated in FIG. 3, both the first and second connectors 38 and 40 include a body 42 and one or more electrical/optical contacts 44 (not shown for the second connector 40) disposed within the body 42. The contacts 44 permit electrical and/or optical coupling between the cable 34 and other devices. The first and second connectors 38 and 40 include one or more mounting details 46. The first and second connectors 38 and 40 further include annular recesses 47 that are proximate to the contacts 44. The first and second connectors 38 and 40 also each include locking receptacles 49. The receptacles 49 are illustrated as "U" shaped trays, but can be any suitable shape or device to cooperate with a corresponding locking tab, as described below. The receptacles 49 each include locking surfaces 51 that cooperate with the locking tab to lock the receptacle 49 and the locking tab together. The locking surface 51 can protrude from the receptacles 49, can be recessed within the receptacles 49, or can be of any suitable shape or configuration to effectuate a locking relationship between the receptacle 49 and the locking tabs. The first and second connectors 38 and 40 can be substantially identical, as illustrated, or can be of various different sizes and shapes.

With additional reference to FIG. 4, the cover 10 is shown assembled with the cable 34 extending through the cover 10. The cable 34 is seated within the housing 20 such that the first connector 38 is seated at the first end 28 of the housing 20 and the second connector 40 is seated at the second end 30 of the housing. Both the first connector 38 and the second connector 40 are mounted to the first end 28 and the second end 30 respectively by a connector mount 48, described in greater detail below. The wire portion 36 of the cable 34 is at least the length of the cover 10 and may be substantially greater than the length of the cover 10. As illustrated in FIG. 4, excess length of the wire portion 36 is coiled or folded upon itself within the housing 20. Therefore, the cable 34 can be of any reasonable length equal to or greater than the cover 10 and the length of the cable 34 does not need to be limited to the length of the cover 10.

Figure 5:
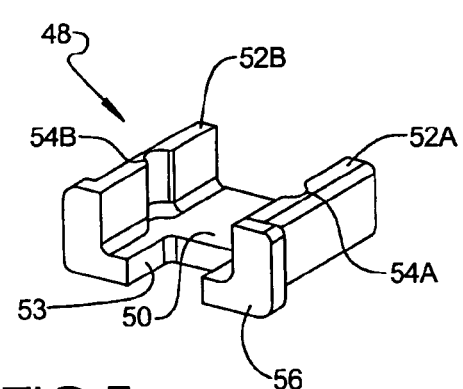
FIG. 5 is a side perspective view of a connector mount used to secure the cable within the cover.

With additional reference to FIG. 5, the connector mount 48 includes a base 50, two sidewalls 52A and 52B extending vertically from the base 50, a pair of notches 54A and 54B located in each of the sidewalls 52 and sized to receive the mounting details 46 of the first and second connectors 38 and 40, and an end flange 56. The base 50 includes a gap portion 53 to accommodate the receptacle 49.

Installation of the cable 34 within the cover 10 will now be described. The cable 34 is inserted within the through hole 24 through either the first opening 26 or the second opening. Because the first and second connectors 38 and 40 are smaller then both the first end 28 and the second end 30, they can easily pass through both the first and second end 28 and 30. With the flexible wire portion 36 of the cable 34 within the through hole 24, the first and second connectors 38 and 40 are extended out from within the first end 28 and the second end 30 respectively so that they can each mate with one of the connector mounts 48.

The first connector 38 mates with the connector mount 48 in the same way that the second connector 40 does. Therefore, the below description of the installation of the first connector 38 at the first end 28 also applies to the installation of the second connector 40 at the second end. The first connector 38 mates with the connector mount 48 such that the first connector 38 is seated on the base with the mounting details 46 seated within the notches 54 to secure the first connector 38 to the connector mount 48 and with the receptacle 49 seated within the gap portion 53. The connector mount 48 is next seated at the first end 28 such that the sidewalls 52 are positioned within the first end 28 of the housing 20 and the end flange 56 abuts an outer portion of the first end 28 of the housing 20. The connector mount 48 is secured in position using any suitable mechanical and/or chemical fastening device or system. For example, the sidewalls 52 can be glued within the housing 20. Further, if the size of the housing 20 is smaller than the size of the connector mount 48, the connector mount 48 can be wedged within the housing 20 with the friction between the housing and the connector mount 48 securing the connector mount 48 in place.

FIGS. 6A and B illustrate an alternative embodiment of the cover 10 at 10'. Because the cover 10' includes many of the same features of the cover 10, the common features are designated with the same reference numbers as those in FIG. 2 but include the prime (') symbol. The above description of these common features equally applies to the cover 10'. Unlike the cover 10, the cover 10' includes a slot 60. The slot 60 is formed within a base 62 of the through hole 24' and extends the entire length of the through hole 24'. The through hole 24' of the cover 10' further includes openings 64 at both the first end 28' and the second end 30'.

Figure 7:
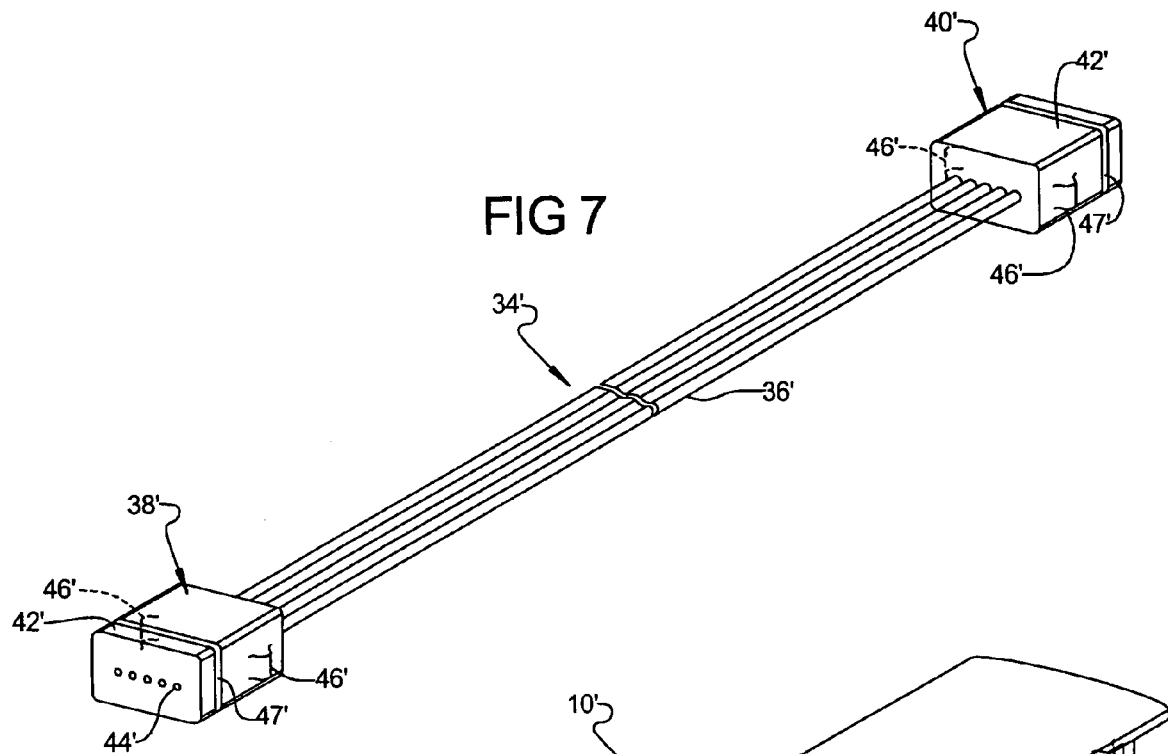
FIG. 7 is a perspective view of a cable according to another embodiment of the present invention.
Figure 8:
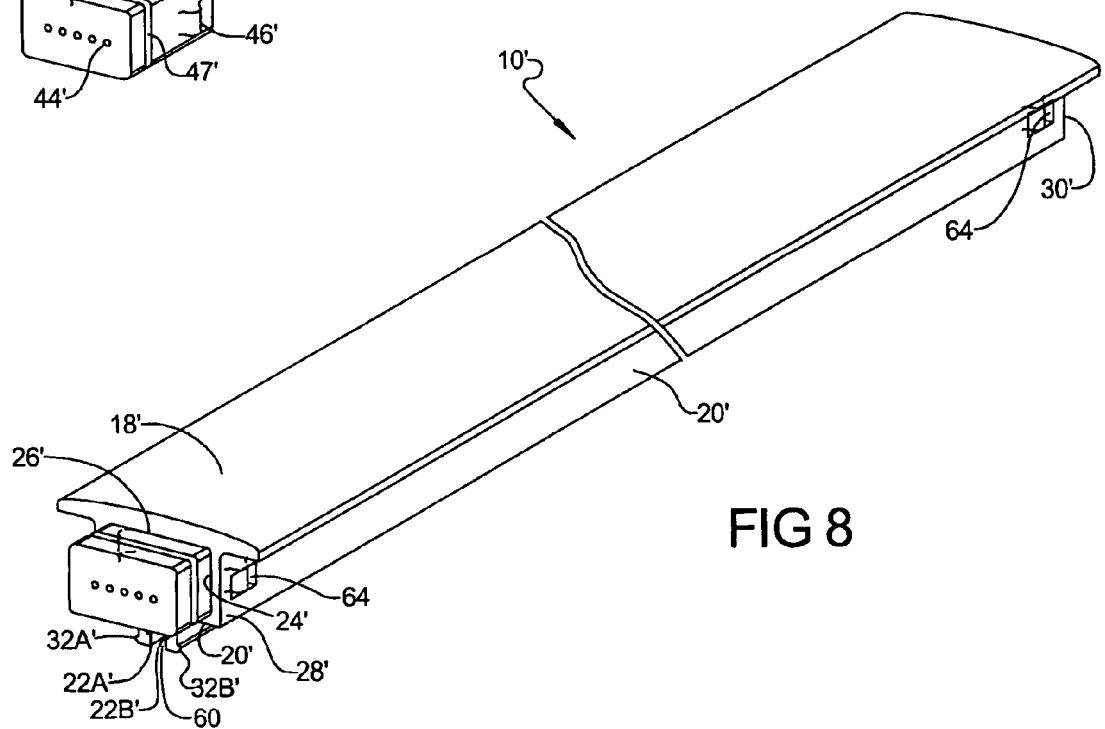
FIG. 8 is a perspective view of the cable of FIG. 7 installed within the seat track cover of FIG. 6A.

With additional reference to FIGS. 7 and 8, a cable 34' is illustrated apart from and installed within the cover 10'. The cable 34' is substantially similar to the cable 34 and therefore, the above description of the cable 34 equally applies to the cable 34' and the common features are illustrated using the same reference numbers, but with the prime (') symbol. The only difference between the cable 34' and the cable 34 is that the first and second connectors 38' and 40' of the cable 34' are slightly larger so that the details 46' can mate with the openings 64 and so the connectors 38 and 40 substantially fill the through hole. Further, although the cable 34' as illustrated does not include the receptacle 49, the cable 34' can also include the receptacles 49.

During installation of the cable 34' within the cover 10', the wired portion 36' is inserted through the slot 60. The first and second connectors 38' and 40' are then inserted within the first and second ends 28' and 30'. The details 46' cooperate with the openings 64 to lock the first and second connectors 38' and 40' into position at the first and second ends 28' and 30' respectively. Use of the connector mount 48 is not necessary with the cover 10' and the cable 34'. The assembled cover 10' including the cable 34' is illustrated in FIG. 8.

With continued reference to FIG. 1, each of the seat groups 16 include at least one seat leg assembly 70. Each seat leg assembly 70 includes a front seat leg 72 and a rear seat leg 73. The front seat leg 72 includes a front connector assembly 74 and the rear seat leg 73 includes a rear connector assembly 76.

With additional reference to FIG. 9, the front connector assembly 74 according to one preferred embodiment of the present invention will now be described in detail. The front connector assembly 74 is generally secured to the front leg 72 at one end and includes a coupler portion 78 at another end. The coupler portion 78 can potentially be configured to rotate about a pivot point A (FIG. 10), slide, or actuate in any other manner to facilitate connection with the cover 10.

The front connector assembly 74 is secured to the front leg 72 using a fastener 80, which allows the front connector assembly 74 to rotate or pivot about the front leg 72 between an upward position (FIG. 9) and a downward or operable position (FIG. 11). The coupler portion 78 includes a connector 82 designed to mate with the contacts 44 of the cable 34. The connector 82 communicates power and/or data to and from the seat group 16 where such power and/or data can be utilized by passengers and crew using various electronic systems such as laptop computers, audio and video systems, and various other personal electronic devices.

The coupler portion 78 of the front connector assembly 74 further includes a seal 84. The seal 84 extends around the inner circumference of the coupler portion 78. The seal 84 can be made of any suitable material, such as a rubber or polymeric material. In many applications the seal 84 is impermeable to water. The seal 84 is seated within a depression that is formed within the coupler portion 78.

With reference to FIG. 12, the rear connector assembly 76 is illustrated in greater detail. The rear connector assembly 76 includes numerous features that are in common with the front connector assembly 74. The features of the rear connector assembly 76 that are also included in the front connector assembly 74 are designated by the same reference numerals, but also include the prime (') symbol. The above description of these common elements in relation to the front connector assembly 74 also applies to the rear connector assembly 76. Unlike the coupler portion 78 of the front connector assembly 74, the coupler portion 78' of the rear connector assembly 76 includes a tab 86 having a boss 87. As illustrated, the tab 86 is a flexible tab that extends from the coupler portion 78' towards the front seat leg 72. The tab 86 is sized to mate with the receptacle 49 (FIG. 3) of the cable 34 so that cooperation between the boss 87 and the locking surface 51, as described below, secures the cable 34 to the rear connector assembly 76.

With additional reference to FIG. 13, installation of the cover 10 between two of the aircraft passenger seat groups 16 to provide a connection between the front connector assembly 74 of one of the seat groups 16 and the rear connector assembly 76 of another one of the seat groups is illustrated. Installation of the cover 10' is substantially similar to installation of the cover 10 and the description of the installation of the cover 10 also applies to the cover 10'.

With reference to FIGS. 10, 11, and 13, installation of the cover 10 between two of the seat groups 16 in which one of the coupler portions 78 rotates is illustrated. As illustrated, in this embodiment the second connector 40 is first inserted into the rear connector assembly 76 with the rear connector assembly 76 in the upward position as described above. The second connector 40 is inserted within the coupler portion 78' such that connector 82' mates with the contact 44, the tab 86 mates with the receptacle 49, and the boss 87 passes over the locking surface 51 to secure the second connector 40 to the coupler portion 78'. The seal 84' mates with the recess 47 to provide a water tight connection.

Next, with the front connector assembly 74 in the upward position, the rotating coupler 78 is rotated down toward the seat track 12 to mate with the first connector 38 and to bring the connector 82 into contact with the contacts 44. The seal 84 mates with the recess 47 to provide a water-tight connection between the first connector 38 and the rotating coupler 78. The front connector assembly 74 is then rotated down toward the seat track 12 to cause further engagement between the rotating coupler 78 and the first connector 38. With reference to FIG. 11, once the front and rear connector assemblies 74 and 76 are moved to their lowered positions, the tabs 32 of the cover 10 are snapped into engagement with the seat track 12 to secure the cover 10 to the seat track 12. The absence of a feature similar to the tab 86 at the first connector 38 provides a less rigid connection between the first connector 38 and the coupler portion 78 than the connection between the coupler portion 78' and the second connector 40. Therefore, the connection between the first connector 38 and the coupler portion 78 can be made even if the cover 10 is slightly longer or shorter than the distance between the neighboring seat groups 16, thus providing a reasonable manufacturing tolerance.

Figure 14:
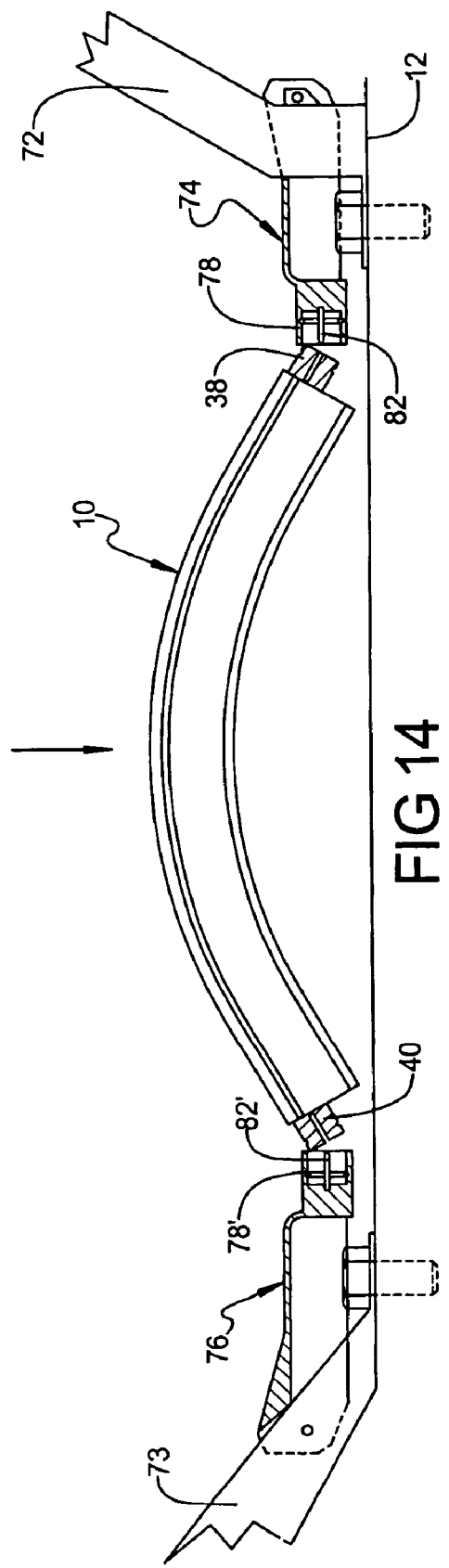
FIG. 14 is a pre-installation side view of a flexible seat track cover.

With reference to FIG. 14, installation of the flexible cover 10 between two of the seat groups 16 is illustrated. Because the cover 10 is flexible in this embodiment, the cover 10 can be brought into contact with the front and rear connector assemblies 74 and 76 while the connector assemblies 74 and 76 are in the downward operable position by "inch-worming" the cover 10 between the connector assemblies 74 and 76 whereby the first connector 38 and the second connector 40 are bent downward to engage the connector assemblies 74 and 76 and then the middle portion of the cover 10 is pushed downward to contact the seat track 12.

With reference to FIG. 11, once the cover 10 is in contact with the front and rear connector assemblies 74 and 76, the tabs 32 of the cover 10 are locked to the seat track 12 to secure the cover 10 in position. Once installed, the cover 10 provides an electrical power and/or data connection between the front connector assembly 74 and the rear connector assembly 76 to transfer data and/or power from one seat group 16 to another. One of the seat groups 16 is typically in contact with a data and/or power source (not shown) using one of the covers 10 or any other suitable connection. Therefore, by connecting additional seat groups 16 to the seat group 16 that receives data and/or power from the data/power source using the cover 10, all of the connected seat groups 10 can be serially coupled to receive and/or transmit data and/or power between each other and the data/power source.

One of ordinary skill in the art will appreciate that installation of the cover 10 can be performed in a variety of different ways in addition to the manner described above. For example, instead of inserting the first connector 38 into the front connector assembly 74 first, the second connector 40 can be inserted within the rear connector assembly 76 first. Also, the orientation of the cover 10 can be reversed so that the second connector 40 mates with the front connector assembly 74. Still further, the cover 10 can be brought into contact with the front and rear connector assemblies 74 and 76 at the same time. Even further, the coupler portion 78 within front connector assembly 74 can be fixed while the coupler portion 78' within rear connector assembly 76 can pivot. Still further, top portion 18 may be substantially the same width as housing 20 and may have a flat shape to allow the top surface of the cover 10 to be flush with the floor 14 to allow, for example, carpet to cover the cover 10. Also, the coupler portion 78' of the front connector assembly 74 may also include a feature similar to the tab 86 to allow the first connector 38 to lock into the coupler portion 78, thus allowing both the first and second connectors 38 and 40 to both be locked to their respective connector assemblies.

Therefore, the present invention provides for a seat track cover that houses a cable 34 that is greater than or approximately equal to the length of the cover 10. The cover 10 has a length approximately equal to the distance between the two seat groups 16 and the cable 34 is chosen from a variety of different cables that typically have the same length, thereby eliminating the need to manufacture or store a plurality of wires of different lengths to accommodate different applications.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A seat track cover for communicating at least one of power and data between two spaced apart seats comprising:
   a housing sized to extend between a first seat leg assembly of a first seat and a second seat leg assembly of a second seat, said housing comprising:
      a channel forming a first aperture at one end and a second aperture opposite said first aperture at a second end of said channel;
   a cable seated within said housing, said cable having a length at least approximately equal to the length of said housing and comprising:
      a first connector; and
      a second connector;
   wherein said cable is seated within said housing such that said first connector is adjacent said first aperture of said housing and said second connector is adjacent said second aperture of said housing so that said housing, said cable, said first connector, and said second connector form a unitary assembly;
   said first connector adapted to couple with said first seat leg assembly and said second connector adapted to couple with said second seat leg assembly when said housing is positioned between said first seat leg and said second seat leg.

2. The seat track cover of claim 1, further comprising a first connector mount and a second connector mount;
   wherein said first connector is supported at said first aperture by said first connector mount and said second connector is supported at said second aperture by said second connector mount.

3. The seat track cover of claim 1, wherein at least one of said first connector and said second connector is supported at said first aperture and said second aperture respectively by a connector mount.

4. The seat track cover of claim 1, wherein said housing cooperates with a seat track to secure said housing between said first seat leg assembly and said second seat leg assembly.

5. The seat track cover of claim 1, wherein said cable includes a flexible conductor portion; and
   wherein said housing is sized to receive an excess portion of said flexible conductor portion when said flexible conductor portion is longer than said cover.

6. The seat track cover of claim 1, wherein said first seat leg assembly includes a first connector assembly and said second seat leg assembly includes a second connector assembly.

7. The seat track cover of claim 6, wherein at least one of said first connector assembly and said second connector assembly articulate about said first seat leg assembly and said second seat leg assembly respectively.

8. The seat track cover of claim 6, wherein said first connector assembly includes a first coupler portion and said second connector assembly includes a second coupler portion, wherein at least one of said first coupler portion and said second coupler portion articulate with said first connector assembly and said second connector assembly respectively.

9. The seat track cover of claim 1, wherein said housing is flexible and can be urged into an arcuate shape.

10. The seat track cover of claim 6, wherein at least one of said first connector assembly and said second connector assembly include a locking feature that cooperates with a corresponding locking receiver on said cable to secure said cable to at least one of said first connector assembly and said second connector assembly.

11. A device for electrically coupling a first seat and a spaced apart second seat, wherein the seats are supported from a seat track mounted to a floor, comprising:
   a seat track cover sized to extend between the first seat and the second seat and adapted to be secured at said seat track; and
   a conductive cable supported by said seat track cover, said cable having a length at least equal to a length of said seat track cover;
   said cover and said cable forming a unitary assembly; and
   said cable is adapted to electrically couple with a first connector assembly of the first seat and a second connector assembly of the second seat.

12. The device of claim 11, wherein said first connector assembly articulates with a first seat leg assembly of said first seat and said second connector assembly articulates with a second seat leg assembly of said second seat.

13. The device of claim 11, wherein said cable includes a first connector and a second connector.

14. The device of claim 13, wherein said first connector is supported at a first aperture of said cover by a first connector mount and said second connector is supported at a second aperture of said cover by a second connector mount.

15. The device of claim 13, wherein at least one of said first connector and said second connector is mounted within said cover by a connector mount.

16. The device of claim 11, wherein said first connector assembly includes a first coupler portion and said second connector assembly includes a second coupler portion;
wherein at least one of said first coupler portion and said second coupler portion articulate with said first connector assembly and said second connector assembly respectively.

17. The device of claim 11, wherein at least one of said first connector assembly and said second connector assembly include a locking feature that cooperates with a corresponding locking receiver on said cable to secure said cable to at least one of said first connector assembly and said second connector assembly.

18. A method for providing an electrical connection between a first seat having a first seat leg and a second seat having a second seat leg, wherein the seat legs are each secured to a common seat track, the method comprising:
sizing a housing to a length that approximates a distance between the first seat leg and the second seat leg;
selecting an electrical cable having a length that is greater than the length of the housing;
mounting the cable to the housing, the cable and the housing forming a unitary assembly;
positioning the housing between the first seat leg and the second seat leg such that the cable makes a connection with electrical connectors associated with said first and second seat legs.

19. The method of claim 18, said positioning step further comprising positioning the housing between a front connector assembly of the first seat leg and a rear connector assembly of the second seat leg.

20. The method of claim 19, said positioning step further comprising using said front connector assembly and said rear connector assembly to effect the electrical connection between the first seat leg and the second seat leg.

21. The method of claim 19, wherein sizing a housing comprises sizing a flexible housing; and
said positioning step further comprises bending said housing to position said housing between said front connector assembly and said rear connector assembly.

22. A method for providing electrical coupling between two spaced apart legs of a corresponding pair of seats, comprising:
forming a flexible cover member having an internal channel, the cover member being adapted to be releasably secured at a track on which said seats are mounted;
inserting a cable within the internal channel, wherein the cable has a length at least as long as the flexible cover;
securing first and second electrical connectors to opposite ends of the cable such that said flexible cover, said cable, and said first and second electrical connectors form a unitary assembly;
forming a first electrical connector plug at a leg portion of a first one of said seats;
forming a second electrical connector plug at a leg portion of a second one of said seats;
orienting said flexible cover above said track so as to extend linearly between said leg portions;
engaging said first connector with said first connector plug of said first seat;
urging the flexible cover into a bowed orientation and aligning said second connector with said second connector plug; and
pushing at an intermediate point along a length of said flexible cover to flatten said flexible cover against said track, to cause said second connector to engage said connector plug of said leg assembly of said second seat to secure said flexible cover between said leg assembly of said first seat and said leg assembly of said second seat.

* * * * *